United States Patent [19]
Weibelzahl

[11] 3,942,091
[45] Mar. 2, 1976

[54] METHOD AND APPARATUS FOR OPERATING A CONVERTER FED ROTATING FIELD MACHINE

[75] Inventor: Manfred Weibelzahl, Erlangen, Germany

[73] Assignee: Siemens Aktiengesellschaft, Munich, Germany

[22] Filed: Aug. 29, 1974

[21] Appl. No.: 501,762

[30] Foreign Application Priority Data
Sept. 6, 1973   Germany............................ 2345035

[52] U.S. Cl..................... 321/5; 321/9 R; 321/69 R
[51] Int. Cl.²........................................ H02M 7/00
[58] Field of Search........... 321/5, 9 R, 69 R; 307/3, 307/27

[56] References Cited
UNITED STATES PATENTS

| | | |
|---|---|---|
| 1,363,707 | 12/1920 | Beard............................ 307/3 |
| 3,211,914 | 10/1965 | Anderson....................... 307/3 |
| 3,824,442 | 7/1974 | King.............................. 321/5 |
| 3,839,667 | 10/1974 | King............................. 321/9 R |

*Primary Examiner*—William M. Shoop
*Attorney, Agent, or Firm*—Kenyon & Kenyon Reilly Carr & Chapin

[57] ABSTRACT

An improved method and apparatus for operating a converter fed rotating field machine to obtain better utilization of the converter rectifiers in which the stator windings of the machine are fed with non-sinusoidal phase currents with one phase current always limited to a maximum value and the other phase currents increased by the difference between that maximum value and a typical sinusoidal wave current. This is accomplished in such a manner that the power and torque of the rotating field machine are not affected.

9 Claims, 8 Drawing Figures

METHOD AND APPARATUS FOR OPERATING A CONVERTER FED ROTATING FIELD MACHINE

BACKGROUND OF THE INVENTION

This invention relates to rotating field machines in general and more particularly to an improved method and apparatus for operating a converter fed three phase rotating field machine having a neutral return.

The control characteristics of three phase drives can be substantially improved if they are designed as converter fed rotating field machines as taught in Siemens-Zeitschrift 1971, pp. 174 to 176. As disclosed therein and as is common in the art the windings are fed with symmetrical sinusoidal phase currents much in the manner that rotating field machines fed directly from a three phase system are fed. In order to carry out such a feeding of phase currents the converter rectifiers used in a converter feeding such a machine must be selected to withstand the peak values of current and voltage. In this type of operation where sinusoidal phase currents are fed to the machine one rectifier must carry half wave peak of a phase current at points in time where the two other rectifiers have currents therethrough only half the maximum current. However, all of the rectifiers must be capable of carrying the peak value of the phase currents, even though this value is present only for short times. As a result the overall degree of utilization of the rectifiers is poor.

In view of this, it is the object of the present invention to achieve better utilization of the converter rectifiers in such a converter fed rotating machine without degrading the power and torque of the machine.

SUMMARY OF THE INVENTION

The present invention accomplishes this by superimposing on the sinusoidal fundamentals of the phase currents a harmonic such that one of the phase currents is always reduced to a predetermined maximum value in the central region of a half wave. At the same time the other two phase currents are increased by the difference amount i.e., by the amount the one phase current is reduced. The manner in which this is accomplished results in no adverse effect on the power and torque of the rotating field machine.

DETAILED DESCRIPTION OF THE PREFERRED EMBODIMENT

Figure 1:
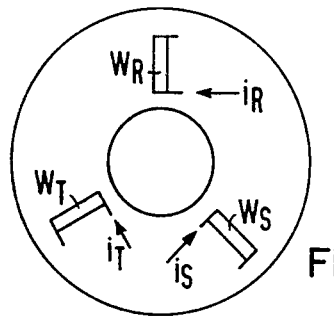
FIG. 1 is a schematic illustration of the stator of a rotating field machine.

FIG. 1 illustrates schematically the stator of a rotating field machine having stator windings $W_R$, $W_S$, $W_T$ carrying the stator currents $i_R$, $i_S$, and $i_T$. When such a stator is fed from a three phase symmetrical system having sinusoidal phase currents phase currents with amplitude $A$, the wave forms of the currents fed to the various phases is given by the following system of equations:

$$i_R = A \sin \omega t$$
$$i_S = A \sin (\omega t - 2\pi/3)$$
$$i_T = A \sin (\omega t - 4\pi/3) \qquad (1)$$

Figure 2:
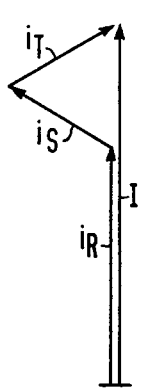
FIGS. 2 and 3 are vector diagrams helpful in understanding the present invention.

At the time $\omega = \pi/2$ for the phase current $i_R$ the vector diagram of phase currents illustrated in FIG. 2 results. Its magnitude in accordance with equations (1) above is as follows:

$$i_R = A; \; i_S = \tfrac{1}{2} A; \; i_T = \tfrac{1}{2} A \qquad (2)$$

The magnitude of the resultant ampere-turns vector I is obtained by vector addition of the individual phase currents and is as follows:

$$I = 3/2 A \qquad (3)$$

In accordance with the present invention however the windings of the rotating field machine of FIG. 1 are not fed with sinusoidal phase currents as given above with equation 1 but with phase currents which have a supplementary current or harmonic superimposed on the sinusoidal fundamental. The equations of the current fed under the method of the present invention are expressed as follows:

$$j_R = i_R \pm \Delta i; \; j_S = i_S \pm \Delta i; \; j_T = i_T \pm \Delta i. \qquad (4)$$

In accordance with these equations, a supplemental current $\Delta i$ is vectorially subtracted or added to each phase current. For the case where the supplemental current has a magnitude Z at the time $\pi/2$ for the phase current $i_R$ a vector diagram such as that of FIG. 3 results. That is to say, the supplemental current quantity Z is subtracted from the current vector $j_R$ and added to the current $J_S$ and $J_T$. This can be expressed in equation form as follows:

$$j_R = A - Z; \; j_S = A/2 + Z; \; j_T = A/2 = Z \qquad (5)$$

Figure 3:
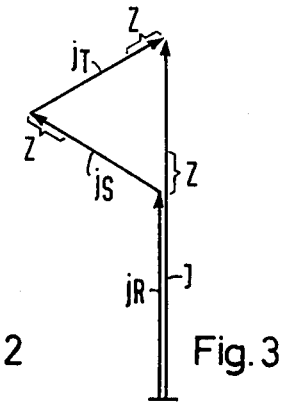

The resultant ampere-turns vector J for FIG. 3 is found to be as follows:

$$J = 3/2 \cdot A \qquad (6)$$

It is noted that the result in equation (6) is exactly the same as the result in equation (3) where sinusoidal phase currents were used. It can be shown that the results of the equations (5) and (6) are valid for any point in time. Thus, feeding a rotating field machine in accordance with the present invention using phase currents deviating from a sinusoidal shape results in two uniformly rotating ampere-turns vector of constant length. As a result the magnetic component and the torque forming component of the phase currents can always be maintained constant. Due to the symmetrical geometry of the machine, the components of the ampere-turns stemming from the supplemental currents cancels so that the supplemental currents have no influence on the resultant ampere-turns vector and do not contribute to the magentization and torque. As a result the torque and power of the machine are not affected. However the controlled rectifiers used in generating the phase currents no longer need be designed for the peak value A of the phase currents but only for a smaller value $A-Z$.

Figure 4:
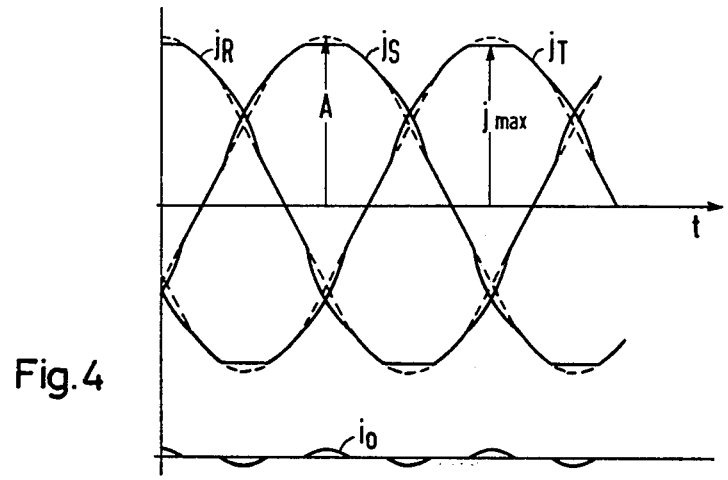
FIGS. 4 and 5 are waveform diagrams illustrating the method of the present invention.

FIG. 4 illustrates the wave forms of the phase currents and the currents in the neutral return line. The phase currents, in accordance with the present invention, have the wave shapes shown in solid lines with the sinusoidal fundamentals from which they are derived shown in dashed lines. Each phase current is reduced in the central region of the half-wave to a maximum value $j_{max}$. At this point the other two phase currents are increased by this respective difference amount. Thus, if one phase current deviates from the sinusoidal shape, the other two phase currents are then displaced by the same difference amount. This can be considered as feeding a neutral conductor current $i_o$ into the neutral return line.

Fourier analysis of the phase currents shows that their waveshape is formed by a sinusoidal fundamental and a harmonic of $3n$ times the frequency, which is superimposed in common to all the fundamental where $n$ can assume the values 1, 2 and 3. The advantages of the present invention can be achieved in an optimal manner if each phase current is reduced to the $\sqrt{3/2}$ times the peak value of the fundamental in the range of $\pi/3$ to $2\pi/3$ of the wave and the other two phase currents are at the same time increased by the same respective difference amount. For this type of operation the waveforms of each of the phase currents and the supplemental current in the neutral return conductor is illustrated on FIG. 5. The phase currents according to the present invention are again shown as solid lines designated $j_R'$, $j_S'$, and $j_T'$. The sinusoidal fundamentals are shown in dashed lines. As illustrated by the dotted line drawn at time $t_1$, which can be any given time, it can be seen how the waveform of the phase currents is obtained. The difference amount D between the maximum value $j'_{max}$ and the corresponding sinusoidal fundamental of the phase S is added to the fundamental of the phase R as well as to the fundamental of the phase T.

Confining the limitation of phase current to the maximum value $j_{max}'$ in the center region of the half-wave from $\pi/3$ to $2\pi/3$ follows from the circumstance that at these points in time the other two phase currents have their zero crossings. If the limitation takes place at an earlier or later time the difference amount could not be added to the other phase currents with the correct sign. The magnitude of the maximum value $j'_{max}$ follows from the instantaneous value of the sinusoidal fundamental at the time when the limitation sets in.

This is expressed by the following equation:

$$j'_{max} = A \sin \frac{\pi}{3} = \frac{\sqrt{3A}}{2} = 0.866 A \qquad (7)$$

The current curve of a phase current $j_R'$ is thus described as follows:

in the range $\omega t = 0$ to $\pi/3$: $j_R' = \sqrt{3/2A}\,[2\cos(\omega t - \pi/3) - 1]$ in the range $\omega t = \pi/3$ to $2\pi/3$: $j_R' = (\sqrt{3/2})\,A$ \qquad (8)

In other ranges the current curve is correspondingly symmetrical.

A Fourier analysis of this current curve shows that the supplemental current $i_o'$ in the neutral return conductor consists essentially of the third harmonic of the fundamental. The percentages of the 6th and 9th and higher harmonics are negligibly small.

The better utilization of the converter rectifiers follows from the ratio of the amplitude of the sinusoidal fundamental to the maximum value of the phase currents according to equation 7. This can be expressed as follows:

$$\frac{A}{j'_{max}} = \frac{2}{\sqrt{3}} = 1.15 \qquad (9)$$

The maximum improvement of utilization attainable with this embodiment of the invention for constant machine power is therefore approximately 15 percent.

The method of the present invention can be applied to any converter in which the instantaneous values of phase currents are being controlled. Such control is particularly simple where direct converters of the type discloded in "Line Commutated Thyristor Converters" by G. Molten (Pitman Publishing, London 1972) pages 344 –346.

Figure 6:
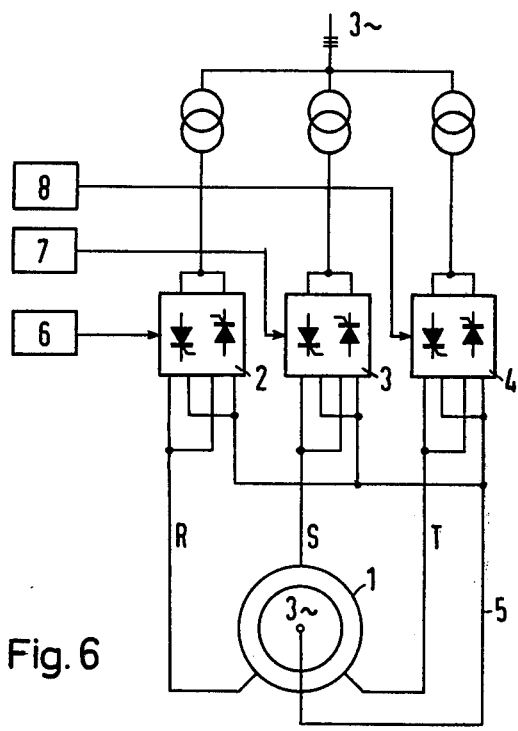
FIG. 6 is a block diagram illustrating apparatus for carrying out the method of the present invention.

FIG. 6 shows an installation of this nature. Shown is a three phase rotating field machine 1 in which the phases R, S and T are fed by controlled converter groups 2, 3 and 4. The respective converters groups 2, 3 and 4 i.e. cycloconverters are controlled by control means 6, 7 and 8. These control means 6, 7 and 8 form a three phase reference value system where the reference values do not have a sinusoidal waveform but in accordance with the present invention have a waveform of a shape corresponding to the superposition of a sinusoidal fundamental and a harmonic.

Figure 7:
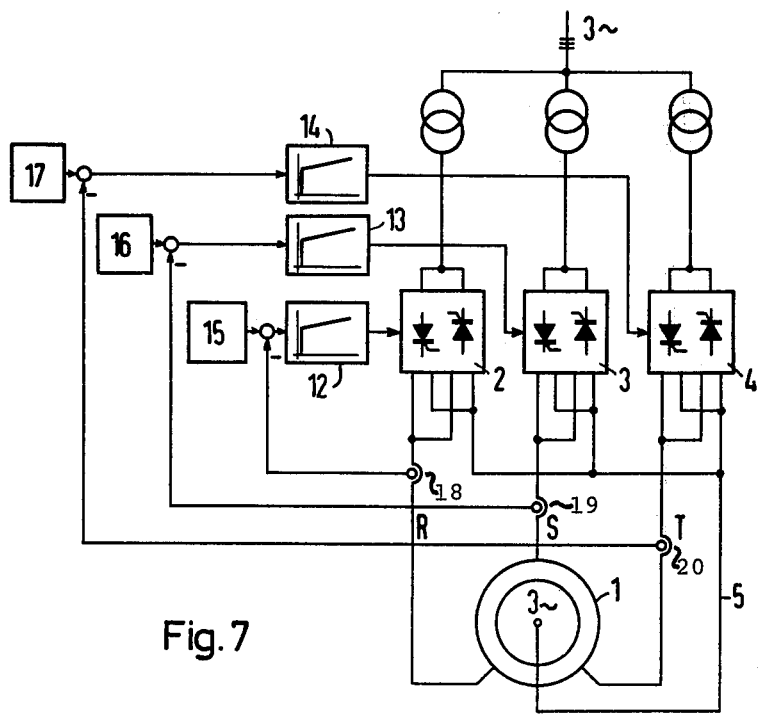
FIG. 7 is a block diagram illustrating the apparatus of FIG. 6 in more detail.

FIG. 7 shows in more detail the manner of accomplishing of such operation. In the embodiment illustrated thereon the respective converter groups 2, 3 and 4 are fed by current controls 12, 13 and 14. The current controls 12, 13 and 14 obtain reference inputs from reference value transmitters 15, 16 and 17 respectively. These develop reference values are summed at a summing junction at the input of the current controllers with actual values of currents obtained from current transformers 18, 19 and 20 located in the lines to the rotating field machine 1. The current controls 12, 13 and 14 can simply be operational amplifier integrator type controls whose output will change in accordance with the error signal developed at their input summing junction in well known fashion. That is to say at the summing junctions the value commanded by the reference value transmitters is compared with the actual current and the output of the controllers 12, 13 and 14 changed accordingly to maintain a current input corresponding to that commanded by the reference value transmitters. The reference value transmitters will of course command a waveshape of the type illustrated by FIG. 5.

Reference value transmitters presently used in systems of this nature are designed to result in a sinusoidal output from the controlled converters. These reference value transmitters, disclosed in the above quoted reference, can be adapted to form reference values suitable for carrying out the present invention, i.e., to have a waveform such as that illustrated on FIG. 5 if followed by transformation stages such as those illustrated on FIG. 8. Thus, on that figure, conventional reference value transmitters 23R, 23S and 23T followed by respective transformation stages 2OR, 20S and 20T are illustrated. The conventional reference value transmitter 23R and stage 20R are the reference value transmitter 15 of FIG. 7. Similarly the reference value transmitter 23S and the stage 20S would be the reference value transmitter 16 and the reference value transmitter 23T and stage 20T the reference value transmitter 17 of FIG. 7. As illustrated on FIG. 8, the transformation stages 20R, 20S and 20T each contain a summing amplifier 21 and a difference amplifier 22. At the summing junction input of each of the amplifiers 21 which are also designated with a letter indicating their associated phase, the first value provided is the sinusoidal reference output of a respective conventional reference value transmitter. Thus, summing amplifier 21R has as a first input the sinusoidal control valiable $i^*_R$ from the reference value transmitter 23R. Difference signal values $\delta S$ and $\delta T$ from the other two stages are summed with the $i^*_R$. The output signal of the summing amplifier 21R is limited to a value $j^*_{max}$. This is the maximum value of phase current corresponding to the value of FIG. 5. The difference amplifier 22R forms the difference between the signal $o_R$ corresponding to the input signal to the amplifier 21R and the output of the summing amplifier 21R to develop a signal $\delta_R$. Summing amplifier 21 and difference amplifier 22 both have a gain of 1 through proper selection of input and feedback resistors in well known fashion. Operation of this circuit can be expressed by the following equation as long as the output of the amplifier is below $j_{max}^*$:

$$j_R^* = i_R^* + \delta_S + \delta_T$$

$$j_S^* = i_S^* + \delta R + \delta_T$$

$$j_T^* = i_T^* + \delta_R + \delta_S \qquad (10)$$

Figure 8:
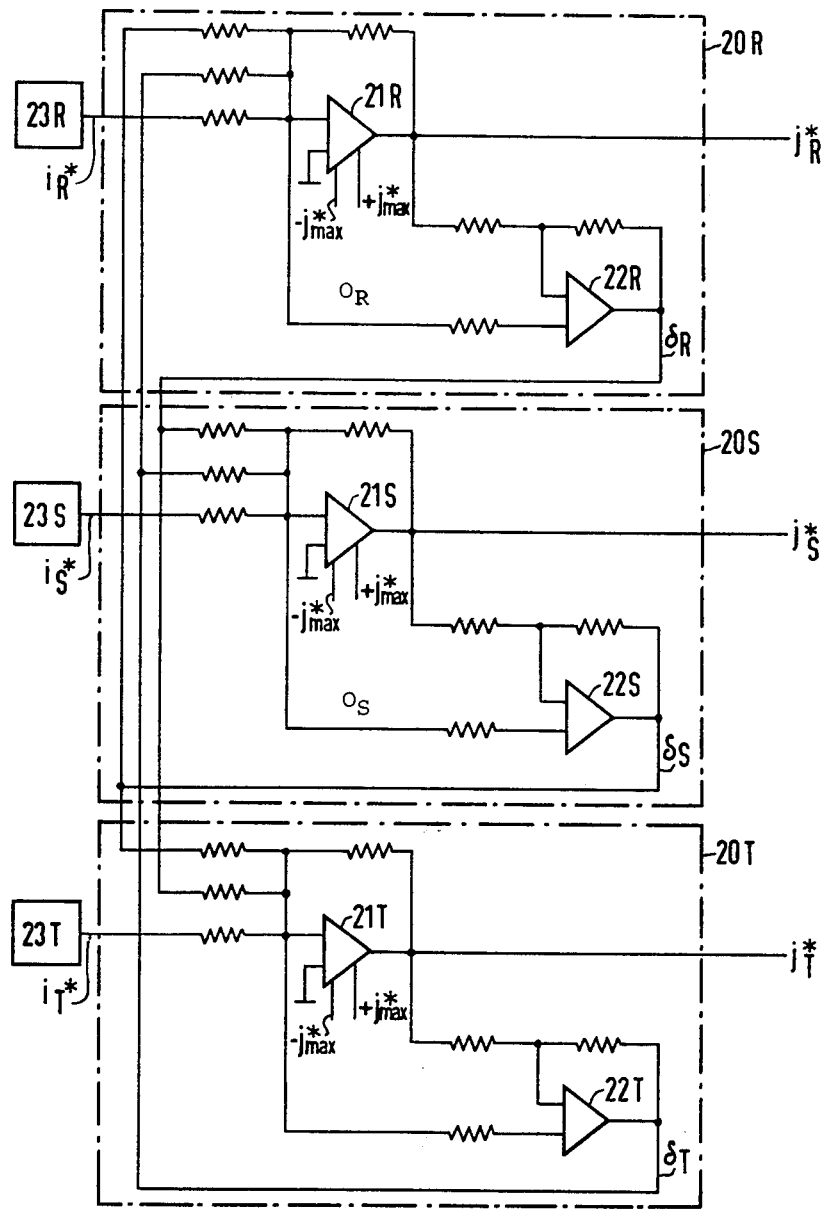
FIG. 8 is a circuit diagram of the manner in which the transmitters of FIG. 7 can be implemented.

As illustrated on FIG. 8 each of the amplifiers 21R, 21S and 21T have as reference voltage inputs minus $j^*_{max}$ and $+j^*_{max}$. This is the manner in which their outputs are limited to this value. Thus, with their gain equal to 1 if the input signal $o_R$ does not exceed $j^*_{max}$ the output will be equal to the input and the difference amplifier 22R will have an output of zero. However once the input exceeds the maximum output, i.e., when the amplifier reaches saturation, the input signal $o_R$ will exceed the output signal of $j^*_{max}$ and the difference amplifier will have the difference between the input and the limited output as its output. This type of operation can be expressed by the following equations:

$$\delta_R = j_R^* - (i_R^* + \delta_S + \delta_T)$$

$$\delta_S = j_S^* - (i_S^* + \delta_R + \delta_T)$$

$$\delta_R = j_T^* - (i_T + \delta_R + \delta_S) \qquad (11)$$

Figure 5:
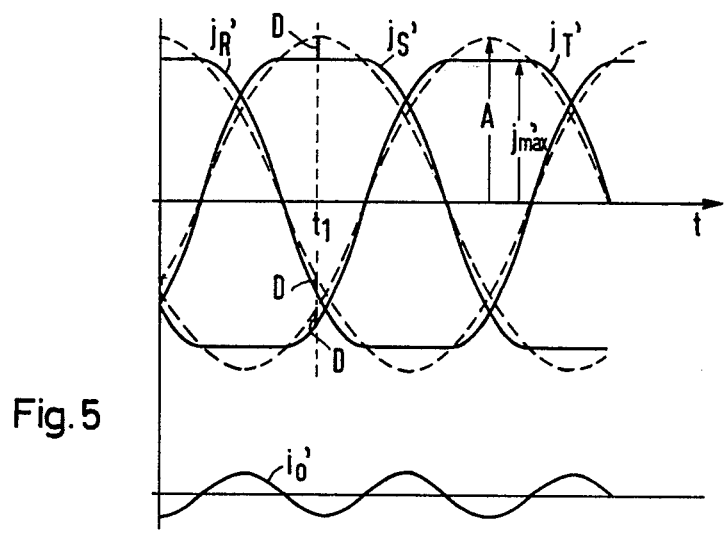

At the time shown on FIG. 5 the summing amplifier 21S of FIG. 8 will have gone into saturation with its output at $j^*_{max}$. The input signal $i^*_S$ at this point will have the value of the sinusoidal fundamental. The amplifiers 21R and 21T will not be saturated and thus the outputs of amplifiers 22R and 22T will be approximately zero causing the values $\delta_R$ and $\delta_T$ to be zero. As a result the only effective input at amplifier 21S is the output signal $i^*_S$ corresponding to the peak value of the fundamental shown on FIG. 5 and as a second value the limiting value $j_{max}^*$. It will thus develop an output signal $\delta_S$ corresponding to the value D on FIG. 5. This value will then be added to the reference value in each of the other two amplifiers 21R and 21T. Thus, the current reference values for the phases R and T at the output can be expressed as follows:

$$j^*_R = i^*_R + \delta_S$$

$$j^*_T = i^*_T + \delta_S$$

Operation in this manner will of course occur for each of the phase currents and the equations hold and the circuit operates for any value of $t$. In addition, the application of the present invention is not limited to the rotating field machines fed by direct converters. In general they can be applied to any kind of converter which has the capability of current control.

Thus an improved method of operating a converter feeding a rotating field machine in order to optimize the controlled rectifiers to use therein has been shown. Although specific embodiments have been illustrated and described, it will be obvious to those skilled in the art that various modifications may be made without departing from the spirit of the invention which is intended to be limited solely by the appended claims.

What is claimed is:

1. A method of operating a converter feeding a three phase rotating field machine having a neutral return line, which machine is normally fed with symmetrical sinusoidal phase currents, the converter being controlled by means of current controls having associated reference value transmitters which form a three phase reference value system, such as to reduce the peak current to which the rectifiers in the converter are subjected comprising generating current reference values which consist of the sinusoidal fundamental of each current with a harmonic superimposed thereon such that one phase current is always reduced to a predetermined maximum value in the central region of a half wave and that at the same time the other two phase currents are increased by a predetermined amount in the outer portion of their half waves.

2. The method according to claim 1 wherein the other two phase currents are increased by the difference of the current in said one phase current and the sinusoidal fundamental thereof.

3. The method as in claim 1 wherein the waveform of the phase currents is formed from the sinusoidal fundamental and a harmonic of $3n$ times the frequency superimposed on all fundamentals in common with n capable of assuming the values 1,2,3.

4. The method according to claim 2 wherein said phase current is reduced in the region from $\pi/3$ to $2\pi/3$ of each halfwave to a value equal to $\sqrt{3/2}$ times the peak value of the fundamental and the two other phase currents at the same time increased by the difference between this value and the value of the fundamental.

5. Apparatus for operating a converter fed three phase rotating field machine having a neutral return line, said rotating field machine being supplied with phase currents generated by converters which are controlled by means of current controls having associated reference value transmitters which form a three phase reference value system, which machine is normally fed with symmetrical sinusoidal phase currents, comprising means for generating current reference values having a waveform with a shape corresponding to the superposition of a sinusoidal fundamental and a harmonic for each phase current such that one phase current is reduced in the central region of the half wave to a predetermined maximum amount and the other two phase currents are increased by a certain amount in the outer parts of their half waves.

6. Apparatus as in claim 5 wherein said converter is a cycloconverter.

7. Apparatus as in claim 6 wherein said means for generating current reference values comprise:
   a. conventional reference value transmitters adapted to generate sinusoidal references; and
   b. means to transform said sinusoidal reference values to waveforms having a shape corresponding to the superposition of a sinusoidal fundamental and a harmonic.

8. Apparatus as in claim 7 wherein said means to transform comprise for each phase:
   a. a summing amplifier having a first input from a respective conventional reference value transmitter
   b. a difference amplifier having as inputs the input of said summing amplifier and the output of said summing amplifier
   c. the values of the supply voltage provided to said summing amplifiers being equal to plus and minus said predetermined value; and
   d. the output of each of said difference amplifiers being provided as additional inputs to the summing amplifiers of the other phases;
   e. the outputs of said respective summing amplifiers being the respective reference value outputs providing a waveform whose shape corresponds to the superposition of a sinusoidal fundamental and harmonic.

9. Apparatus as in claim 8 wherein the supply voltages to said summing amplifiers is a value corresponding to the $\sqrt{3/2}$ times the peak value of the fundamental generated by said conventional reference value transmitters.

* * * * *